United States Patent [19]

Ishikawa et al.

[11] Patent Number: 4,571,020
[45] Date of Patent: Feb. 18, 1986

[54] HOLOGRAM LIGHT DEFLECTOR

[75] Inventors: Hiromi Ishikawa; Masaru Noguchi, both of Kanagawa, Japan

[73] Assignee: Fuji Photo Film Co., Ltd., Kanagawa, Japan

[21] Appl. No.: 453,865

[22] Filed: Dec. 28, 1982

[30] Foreign Application Priority Data

Jan. 6, 1982 [JP] Japan ................................. 57-1243

[51] Int. Cl.⁴ .............................................. G02B 5/32
[52] U.S. Cl. ...................................... 350/3.71; 350/320
[58] Field of Search ................... 350/3.71, 3.73, 3.67

[56] References Cited

U.S. PATENT DOCUMENTS 4,296,994  10/1981  Quick et al. ...................... 350/3.73
4,348,080   9/1982  Funato ............................. 350/3.71

Primary Examiner—Bruce Y. Arnold
Attorney, Agent, or Firm—Sughrue, Mion, Zinn, Macpeak and Seas

[57] ABSTRACT

A method of recording a holographic plate and deflecting light in synchronism in which a scanning beam interference pattern and a synchronous signal interference pattern are both recorded on a holographic plate. When the plate is subsequently rotated, a spherical wave passing through the scanning beam portion of the plate describes an arc in space BB'. Likewise, a spherical wave passing through the synchronous signal portion of the plate describes an arc in space DD'. In this manner, a recording medium can be synchronously scanned when it is disposed along arc BB', and a clock signal can be produced when a grid pattern is disposed within arc DD'. Accordingly, picture images can be recorded or read out at high accuracy even if the holograms are spaced unevenly.

13 Claims, 6 Drawing Figures

HOLOGRAM LIGHT DEFLECTOR

BACKGROUND OF THE INVENTION

The present invention relates to a light deflector utilizing holograms.

Conventional light deflectors include mechanical light deflectors such as rotary multimirrors and galvanometers, ultrasonic light deflectors which utilize the interaction between an ultrasonic wave and a light beam, and hologram light deflectors which utilize moving holograms. In general, hologram light deflectors are less costly than the other types of light deflectors because the hologram (which is a major component thereof) can be reproduced in large quantities by either a photographic process or a thermal pressing process. In addition, the hologram itself has an inherent lens effect, obviating the need to use a condenser lens.

In a hologram light deflector, the direction of a first-order reconstructed diffraction light is varied by changing the relative positional relationship between a hologram plate having a lens effect and a reconstructing illumination light. Such hologram light deflectors include an array of holograms recorded along the circumference of a rotating disk, an array of reflection holograms recorded on a rotating spherical or concave surface along its direction of rotation, or an array of holograms recorded along a side surface of a rotating cylinder or prism.

The hologram light deflector comprises a plurality of holograms which reconstruct a plurality of scanning beams during the course of one revolution of the deflector. Typically, the holograms are spaced at regular intervals and are scanned by scanning beams clocked at correspondingly regular intervals, producing even scanning lines. However, if the holograms are spaced at irregular intervals, the scanning of the holograms with scanning beams clocked at regular intervals produces uneven scanning lines because the scanning starting points vary from hologram to hologram. As a result, jitter is created which distorts the image formed by the scanning lines. Previous attempts to reduce this problem by increasing the accuracy of the fabrication of the hologram light deflector have been both costly and subjected to technical limitations.

A method of aligning scanning starting points by detecting variations in the intensity of zero-order light at the time of hologram reconstruction has been described in Japanese Patent Laid-Open Publication No. 55-38530. By using this method, the scanning starting points can be aligned by a simple arrangement without the need for improving the fabrication accuracy of the hologram light deflector. However, this method is insufficient for precisely positioning the scanning beam throughout its full scanning range. Specifically, when the hologram light deflector rotates irregularly, the accuracy of the position of a scanning point which is generated by signals cannot be compensated. This is due to the fact that whether picture elements are generated (by clocks at constant intervals after the scanning has started) or signals for reading out picture images are generated, the position of the scanning beam is ultimately dependent upon either the accuracy of a driving device or the accuracy with which the holograms are attached to the deflector.

SUMMARY OF THE INVENTION

It is thus an object of the present invention to provide a hologram light deflector which is capable of determining the positions of picture elements with a high accuracy, while allowing for errors in the accuracy of the intervals between the holograms and/or errors in the accuracy of the speed of movement of the holograms.

According to a feature of the present invention, scanning with high accuracy is possible with a hologram light deflector in which a scanning beam moves at irregular speeds, e.g., where the angle of deflection $\theta$ and the distance of movement x on a scanning surface have the relationship: $x = f \cdot \tan \theta$ (f being a constant).

According to the invention, there is provided a hologram light deflector in which a scanning beam is produced by varying the direction of a diffraction beam to be reconstructed by changing the positional relationship between a hologram and a reconstructing illumination light, characterized as comprising a first hologram for reconstructing the scanning beam and a second hologram for reconstructing a beam for generating a synchoronous signal.

In accordance with the present invention, a hologram light deflector has a plurality of hologram plates which are rotatable for reconstructing a plurality of scanning beams with one or more rays of reconstructing illumination light to produce similar scanning paths, which paths are formed by the focussed spots of the reconstructed beams. According to a preferred embodiment, a grid pattern for generating clock signals may be arranged on one scanning path to detect light transmitted therethrough, creating an electric signal which serves as a synchronous signal.

The rays of reconstructing illumination light may be divergent light rays (being scattered from an axis of rotation) or parallel light rays. The focused spots may then be formed from the reconstructed light by a lens system.

The present invention can be incorporated in any type of hologram light deflector which has either an array of holograms recorded along the circumference of a rotating disk or an array of holograms recorded along a side surface of a rotating prism.

BRIEF DESCRIPTION OF THE DRAWINGS

The present invention will be described in greater detail with reference to the appended drawings, in which.

DETAILED DESCRIPTION OF THE PREFERRED EMBODIMENTS

Figure 1A:
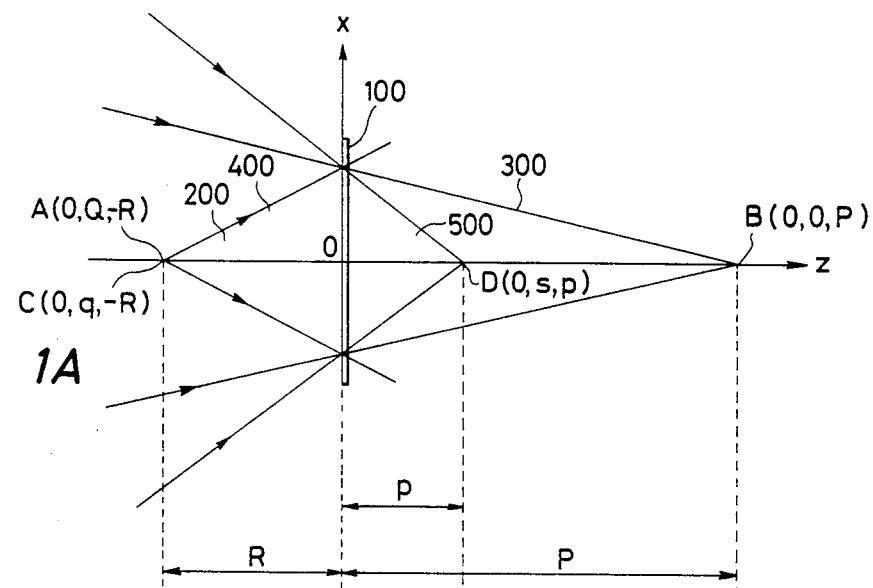
FIGS. 1A and 1B are diagrams illustrating a process of recording a hologram plate according to a first embodiment of the invention which is incorporated in a prismatic hologram light deflector.
Figure 1B:
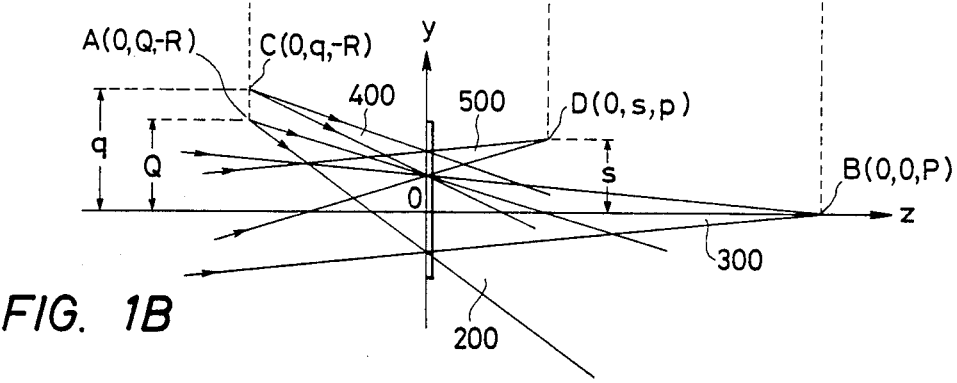

FIGS. 1A and 1B are illustrative of a process for recording a hologram plate for use in a prismatic hologram light deflector, FIG. 1A being a top view and FIG. 1B being a side elevational view thereof.

An (x, y, z) coordinate system is established as shown with a point O on a hologram recording material 100 serving as the origin. A hologram plate is formed by recording a first set of interference fringes with a spherical wave 200 diverging from a point A (O, Q, −R) serving as the reference light and a spherical wave 300 converging toward a point B (O, O, P) serving as the subject light. A second set of interference fringes with a spherical wave 400 diverging from a point C (O, q, −R) serve as the reference light and a spherical wave 500 converging toward a point D (O, s, p) serve as the subject light.

The first set of interference fringes recorded by the spherical waves 200, 300 is used for reconstructing a scanning beam, and the second set of interference fringes recorded by the spherical waves 400, 500 is used for generating a synchronous signal. In FIGS. 1A and 1B, the above hologram portions are recorded so that they do not overlap. However, they may be recorded within the same area by way of multiple image storage.

Figure 2:
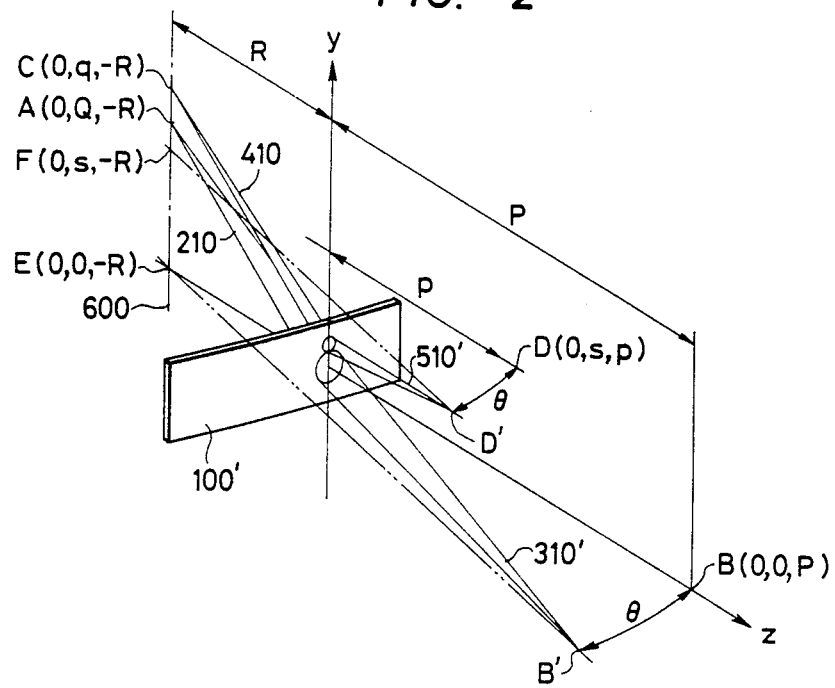
FIG. 2 is an explanatory diagram of the light deflecting action and a synchronous signal generating mechanism of the hologram plate.

FIG. 2 is a diagram which shows the manner in which the hologram plate thus formed is employed to deflect light in synchronism.

The hologram plate is first placed in the same coordinate system as that employed during the original recordation of the plate. When a spherical wave 210 diverging from the point A (O, Q, −R) and a spherical wave 410 diverging from the point C (O, q, −R) fall upon the hologram plate, spherical waves converging toward the points B (O, O, P) and D (O, s, p) are formed. The spherical waves 210, 410 are equivalent to the reference lights 200, 400 used when recording the hologram plate.

The hologram plate 100 is then rotated into a position 100' through an angle θ about a straight line 600 which is defined by points C, A, F, E and is parallel to the y-axis. At this time, the spherical waves 210, 410 are diffracted by the hologram plate 100', and first-order diffraction light beams 310', 510' are spherical waves converging toward points B', D', respectively. Assuming that straight lines extending through the points B, D intersect the axis of rotation 600 at points E, F, the arcs BB' and DD' are defined by the angle θ of rotation of the hologram plate.

When a recording material is put on an arc containing the points B, B' about the point E, a scanning beam 310' will be responsive to the rotation of the hologram for moving its focused point along the recording material. The recording material is thus scanned with beam 310' from the prismatic hologram light deflector. The distance BB' the scanning beam moves and the distance DD' that a beam for generating a synchronous signal moves are in a proportional relationship defined as $DD':BB' = (R+p):(R+P)$. Accordingly, the amount of movement of the scanning beam and the amount of movement of the synchronous signal generating beam are in 1:1 correspondence. Thus, when a grid pattern is placed along an arc containing the points D,D', about the point F (the grid pattern having periodicity in the arcuate direction) light which passes through the grid pattern is detected and converted into an electric signal. The signal is then processed by a suitable electric circuit to generate a clock signal which serves as the scanning reference. The clocks signal is produced on the basis of a photoelectric pulse signal. The pulse signal is generated when the synchronous signal generating beam traverses the grid bars of the grid pattern. Therefore, when the grid bars are spaced at equal intervals, equally spaced scanning spots can be arranged in an array on the scanning surface (signals being carried on the scanning beam by the clock signal).

As a consequence of the operation of the invention, even if holograms are spaced unevenly, picture images can be recorded on read out at high accuracy by generating picture elements or reading picture images as a function of the clock signal.

According to the present invention, by designing a hologram light deflector so that the distance $(R+p)$ from the axis of rotation 600 to the grid pattern is reduced, the grid pattern (and the condenser lens for gathering light passed therethrough) can be correspondingly reduced in size. As an example, by designing a hologram light deflector with $(R+p)/(R+P) = 1/5$, the grid pattern may be of a size which is one-fifth the scanning length. Accordingly, the condenser lens may also be reduced in size, resulting in a compact arrangement.

Generally, a person of ordinary skill in the art would conclude that as the grid pattern is reduced in size it should also be reduced in pitch. However, the pitch of the grid pattern need not be reduced if a suitable process is employed for processing the photoelectric pulse signal into the clock signal which serves as a scanning reference. Japanese Patent Publication Laid-Open No. 54-97050 discloses one such process for generating high-resolution dots with a reduced number of grid bars.

Figure 3:
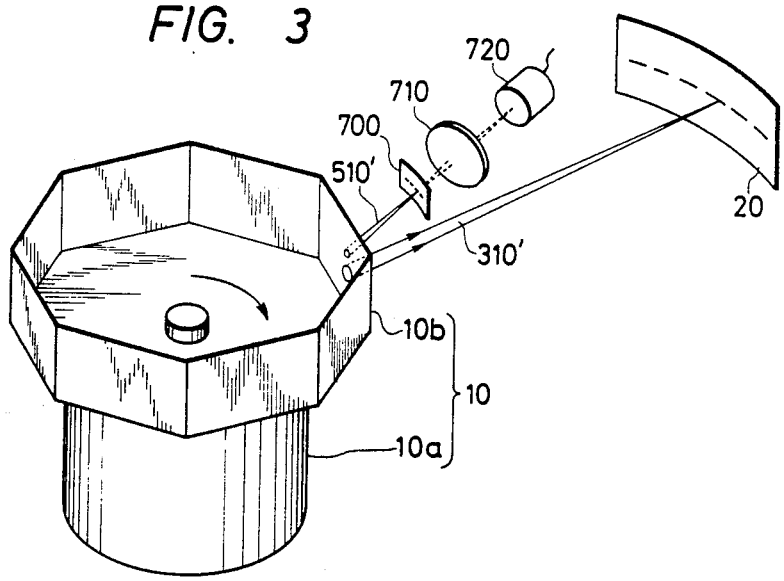
FIG. 3 is a schematic view of a hologram light deflector according to the first embodiment.
Figure 4:
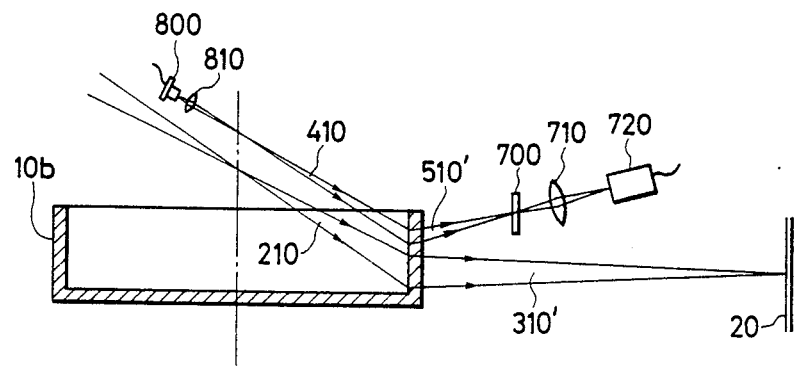
FIG. 4 is a side elevational view of the hologram light deflector of FIG. 3.

FIGS. 3 and 4 show a specific construction by way of example of a prismatic hologram light deflector used in the present invention. It is to be understood that the structure and teachings of the present invention can be applied to any one of a number of known hologram light detector constructions. A hologram light deflector 10 has a rotatable portion 10b which, while rotating, reconstructs both a scanning beam 310' and a synchronous signal generating beam 510'. The synchronous signal generating beam 510' (which is in 1:1 correspondence to the scanning beam 310') passes through grid pattern 700 and condenser lens 710 and condenses upon a photodetector 520. As the rotatable portion 10b of the hologram light deflector 10 rotates, the signal from the photodetector 720 is processed to generate clock signals that are in 1:1 correspondence to the scanning beam positions. With such clock signals serving as a scanning reference, information can be recorded at the correct picture element positions from the scanning starting position to the scanning finishing position.

Light sources in general use are He-Ne lasers and Ar-ion lasers. It is customary to record and reconstruct a scanning beam and a synchronous signal generating beam with light from a single light source. However, it is possible to use different light sources to record and reconstruct the synchronous signal generating beam and to record and reconstruct the scanning beam. For example, FIG. 4 shows an embodiment in which a semiconductor laser is used as a light source for the synchronous signal generating beam. In the foregoing embodiment, the grid pattern is on and along an arc (as the scanning surface is arcuate). Where scanning takes place on a flat surface, the grid pattern is placed on a flat surface.

Figure 5:
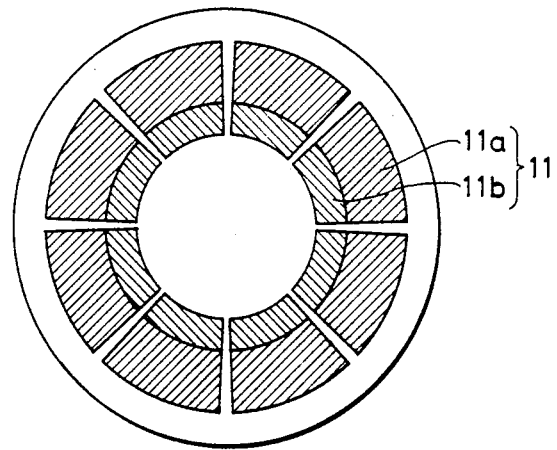
FIG. 5 is a view showing a hologram plate for use in a disk-type hologram light deflector according to a second embodiment of the invention.

FIG. 5 is illustrative of a hologram disk for use in a disk-type hologram light deflector. The disk includes a hologram 11a for a scanning beam and a hologram 11b for a synchronous signal generating beam.

With the present invention as described above, a recording material can be scanned with a light beam at high accuracy and in a compact arrangement, even if the accuracy of fabrication of the hologram light deflector is subject to error.

What is claimed is:

1. A method of recording a hologram plate for use in a beam scanner for reconstructing a scanning beam and a beam for generating a synchronous signal, said plate being disposed within an (x, y, z) coordinate system with its center at the coordinate axis (O, O, O), said method comprising the steps of:

illuminating a first reference light source for producing a spherical wave which diverges from a point A (O, Q, −R) and passes through said plate;

illuminating a first subject light source, coherent with said first reference light source, for producing a spherical wave which passes through said plate and converges on a convergence point B (O, O, P);

said spherical wave from said first reference light source and said spherical wave from said first subject light source producing a first set of interference fringes which are recorded on said plate;

illuminating a second reference light source for producing a spherical wave which diverges from a point C (O, q, −R) and passes though said plate;

illuminating a second subject light source, coherent with said second reference light source, for producing a spherical wave which passes through said plate and converges on a convergence point D (O, s, p);

said spherical wave from said second reference light source and said spherical wave from said subject light source producing a second set of interference fringes which are recorded on said plate;

developing said first and second sets of fringes recorded on said plate;

illuminating a first deflection light source for producing a spherical wave which diverges from said point A (O, Q, −R), passes through said first set of interference fringes recorded on said plate, and converges on said convergence point B (O, O, P);

illuminating a second deflection light source for producing a spherical wave which diverges from said point C (O, q, −R), passes through said second set of interference fringes recorded on said plate, and converges at said convergence point D (O, S, p); and rotating said hologram plate about a reference line parallel to said y-axis and having an origin W (O, O, −R), said hologram plate being rotated through an angle θ with respect to said x-axis, said spherical wave from said first deflection light source being deflected from said convergence point B to a convergence point B' and describing an arc in space BB' and said spherical wave from said second deflection light source being deflected from said convergence point D to a convergence point D' and describing an arc in space DD'.

2. The method of claim 1, wherein the length of said arc BB' and the length of said arc DD' are in a proportional relationship, length $(DD')$/length$(BB') = (R+p)/(R+P)$.

3. The method of claim 2, further comprising the steps of disposing a grid pattern plate within said arc DD'; and detecting light which passes through said grid pattern and producing a clock signal therefrom.

4. The method of claim 3, further comprising the steps of disposing a recording material within said arc BB'; and scanning said material with said spherical wave from said first deflection light source.

5. The method of claim 3, wherein said grid pattern plate comprises a plurality of grid bars which are periodic in the arcuate direction.

6. The method of claim 5, wherein said clock signals are produced by a photosensor which detects light from said grid pattern plate through a condenser lens.

7. The method of claim 6, wherein the size $S_{gp}$ of said grid pattern and the size $S_{CL}$ of said condenser lens varies as a function of the relatioships:

$$S_{gp}=(R+p)/(R+P)X_{gp},$$

and $$S_{CL}=(R+p)/(R+P)X_{CL},$$

where $X_{CL}$ is the size of the condenser lens when $(R+p)=(R+P)$, and $X_{gp}$ is the size of the grid pattern when $(R+p)=(R+P)$.

8. The method of claim 1, wherein said hologram plate is mounted on a rotating prism.

9. The method of claim 1, wherein said hologram plate is mounted on a rotating disk.

10. The method of claim 1, wherein said first deflection light source and said second deflection light source comprise a single He-Ne laser.

11. A hologram light scanning system in which a scanning beam is produced by varying the direction of a diffraction beam to be reconstructed by changing the positional relationship between a hologram and a reconstructing illumination light, comprising: a first source of light; a first hologram receiving the light of said first source for reconstructing the scanning beam; a second source of light; a second hologram receiving the light of said second source for reconstructing a beam for generating a synchronous signal and means for synchronously moving said first and second holograms whereby said scanning beam and said first beam are moved in synchronism.

12. A holographic beam scanning system, comprising:

a hologram plate;

means for maintaining said plate with its surface tangential to a circle about an axis of rotation and for rotating said plate about said axis of rotation;

wherein said hologram plate is formed while said plate is disposed in a coordinate system (x, y, z) with the center of said plate at the coordinate origin O (O, O, O), said forming comprising the steps of:

illuminating a first reference light source for producing a spherical wave which diverges from a point A (O, Q, −R) and passes through said plate;

illuminating a first subject light source, coherent with said first reference light source, for producing a spherical wave which passes through said plate and converges on a point B (O, O, P);

illuminating a second reference light source for producing a spherical wave which diverges from a point C (O, q, −R) and passes through said plate; and illuminating a second subject light source, coherent with said second reference light source, for producing a spherical wave which passes through said plate ad converges on a point D (O, s, p), where p does not equal P.

13. A method of deflecting light with a hologram plate and for generating a synchronous signal, said hologram plate being formed while being disposed in a coordinate system (x, y, z) with the center of said plate at the coordinate origin O (O, O, O) by the forming steps of:

illuminating a first reference light source for producing a spherical wave which diverges from a point A (O, Q, −R) and passes through said plate;

illuminating a first subject light source, coherent with said first reference light source, for producing a spherical wave which passes through said plate and converges on a convergence point B, (O, O, P);

said spherical wave from said first reference light source and said spherical wave from said first subject light source producing a first set of interference fringes which are recorded on said plate;

illuminating a second reference light source for producing a spherical wave which diverges from a point C (O, q, −R) and passes through said plate;

illuminating a second subject light source coherent with said second reference light source, for producing a spherical wave which passes through said plate and converges on a convergence point D (O, s, p);

said spherical wave from said second reference light source and said spherical wave from said second subject light source producing a second set of interference fringes which are recorded on said plate; and developing said first and second sets of fringes recorded on said plate;

said method comprising the steps of:

illuminating a first deflection light source for producing a spherical wave which diverges from said point A (O, Q, −R), passes through said first set of interference fringes recorded on said plate, and converges on said convergence point B (O, O, P);

illuminating a second deflection light source for producing a spherical wave which diverges from said point C (O, g, −R), passes through said second set of interference fringes recorded on said plate, and converges at said convergence point D (O, S, p); and rotating said hologram plate about a reference line parallel to said y-axis and having an origin W (O, O, −R), said hologram plate being rotated through an angle $\theta$ with respect to said x-axis, said spherical wave from said first deflection source being deflected from said convergence point B to a convergence point B′ and describing an arc in space BB′, and said spherical wave from said second deflection source being deflected from said convergence point D to a convergence point D′ and describing an arc in space DD′.

* * * * *